(12) United States Patent
Ferdinand

(10) Patent No.: US 8,497,895 B2
(45) Date of Patent: Jul. 30, 2013

(54) SYSTEM INTEGRATION AND TEST MONITORING OF IMMERSIVE VIDEO NETWORKS

(75) Inventor: Shawn Ferdinand, Allen, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 250 days.

(21) Appl. No.: 13/018,487

(22) Filed: Feb. 1, 2011

(65) Prior Publication Data

US 2012/0194634 A1     Aug. 2, 2012

(51) Int. Cl.
*H04N 7/15* (2006.01)
(52) U.S. Cl.
USPC .................. 348/14.08; 348/14.09; 348/14.12; 370/260; 370/261
(58) Field of Classification Search
CPC ... H04L 12/2602; H04L 41/0621; H04N 17/00
USPC .............. 348/14.01–14.16; 370/260–261; 709/223, 224; 715/736
See application file for complete search history.

(56) References Cited

U.S. PATENT DOCUMENTS

| | | | |
|---|---|---|---|
| 7,385,622 B2 * | 6/2008 | Babka et al. | 348/14.09 |
| 2002/0177428 A1 * | 11/2002 | Menard et al. | 455/404 |
| 2005/0102382 A1 * | 5/2005 | MacGregor et al. | 709/223 |
| 2009/0316585 A1 * | 12/2009 | Srinivasan et al. | 370/241 |

* cited by examiner

*Primary Examiner* — Melur Ramakrishnaiah

(57) ABSTRACT

A computing device determines a schedule for monitoring an immersive video-telepresence (IMV-TP) network, and receives, based on the schedule, immersive video (IMV) information directly from one or more of devices, software, or systems associated with the IMV-TP network. The computing device aggregates the received IMV information, generates a report based on the aggregated IMV information, and provides the generated report to one or more users associated with the IMV-TP network.

20 Claims, 14 Drawing Sheets

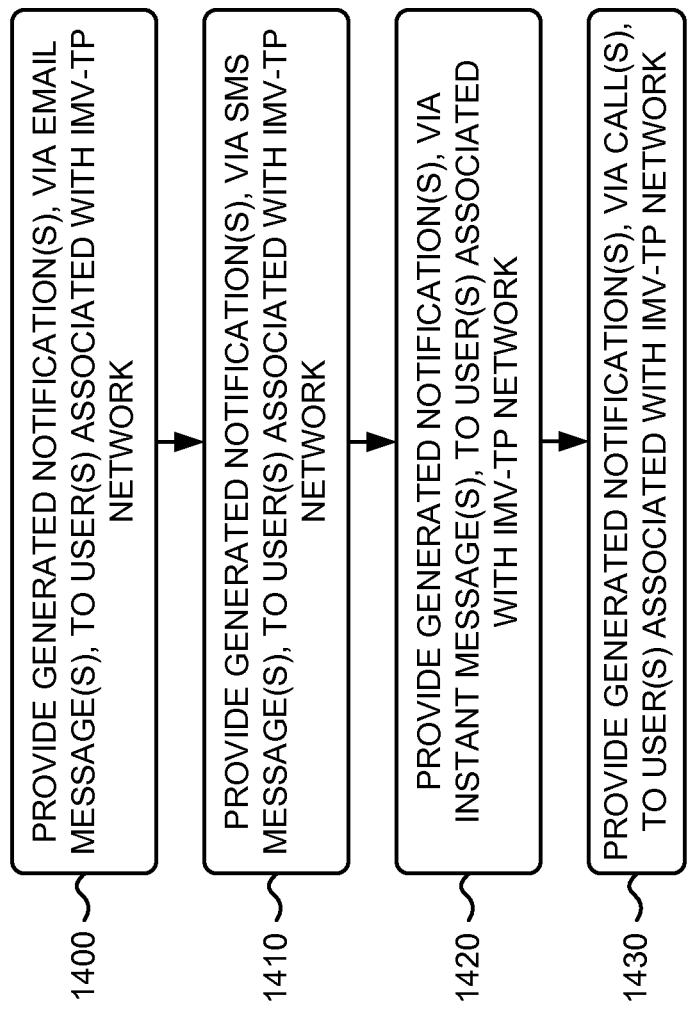

SYSTEM INTEGRATION AND TEST MONITORING OF IMMERSIVE VIDEO NETWORKS

BACKGROUND

Immersive video-telepresence (IMV-TP) is a real-time application that shares some characteristics with Internet protocol (IP) telephony and IP video conferencing, but with more demanding bandwidth and Service Level Agreement (SLA) requirements. IMV-TP provides high definition (HD) video conferencing between customers (e.g., enterprises and companies utilizing a private IP network). Quality of service (QoS) is achieved in IMV-TP with appropriate traffic marking, classification, and conditioning (e.g., queuing, shaping, policing, etc.). IMV-TP traffic flows require between four megabits (Mb) and twenty-five Mb per customer endpoint, depending on configuration. For IMV-TP network-bridged calls, each call will combine in the IMV-TP network for three parties at a maximum bandwidth (e.g., up 3×25 Mb=75 Mb) of traffic.

An IMV-TP network utilizes session initiation protocol (SIP) over transmission control protocol (TCP) for media signaling. Codecs (e.g., for customer premise equipment (CPE) device and network device interactions) are provided in the IMV-TP network for voice, video, and data collaboration (e.g., PowerPoint presentation sharing). MPEG 4 video and G.711 and/or G.729 voice Codecs provide a fully immersive experience through full motion HD video and uncompressed voice.

The IMV-TP network employs several different technologies, protocols, servers, software, and/or devices. Monitoring the functionality of these different technologies, protocols, servers, software, and/or devices is a difficult task. There are several monitoring systems and software products available for monitoring some of the components of the IMV-TP network. However, such monitoring systems and software products do not completely monitor the entire IMV-TP network, and require expensive third party licenses and equipment.

BRIEF DESCRIPTION OF THE DRAWINGS

FIGS. 12-14 are flow charts of an example process for monitoring IMV-TP networks according to implementations described herein.

DETAILED DESCRIPTION OF PREFERRED EMBODIMENTS

The following detailed description refers to the accompanying drawings. The same reference numbers in different drawings may identify the same or similar elements.

Systems and/or methods described herein may provide a system integration and testing (SIT) monitoring tool that monitors an entire IMV-TP network. The SIT monitoring tool may monitor, record, and report activities associated with the IMV-TP network (e.g., the different technologies, protocols, servers, software, and/or devices of the IMV-TP network). The SIT monitoring tool may provide an integrity view of the IMV-TP network, and may report custom indicators that allow network administrators to pro-actively address any problems in the IMV-TP network. The SIT monitoring tool may also provide network management capability to organizations supporting the IMV-TP network.

The term "component," as used herein, is intended to be broadly construed to include hardware (e.g., a processor, a microprocessor, an application-specific integrated circuit (ASIC), a field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

The term "traffic," as used herein, is intended to be broadly construed to include one or more frames, datagrams, packets, or cells; one or more fragments of a frame, one or more fragments of a datagram, one or more fragments of a packet, or one or more fragments of a cell; or another type, arrangement, or packaging of data.

Figure 1:
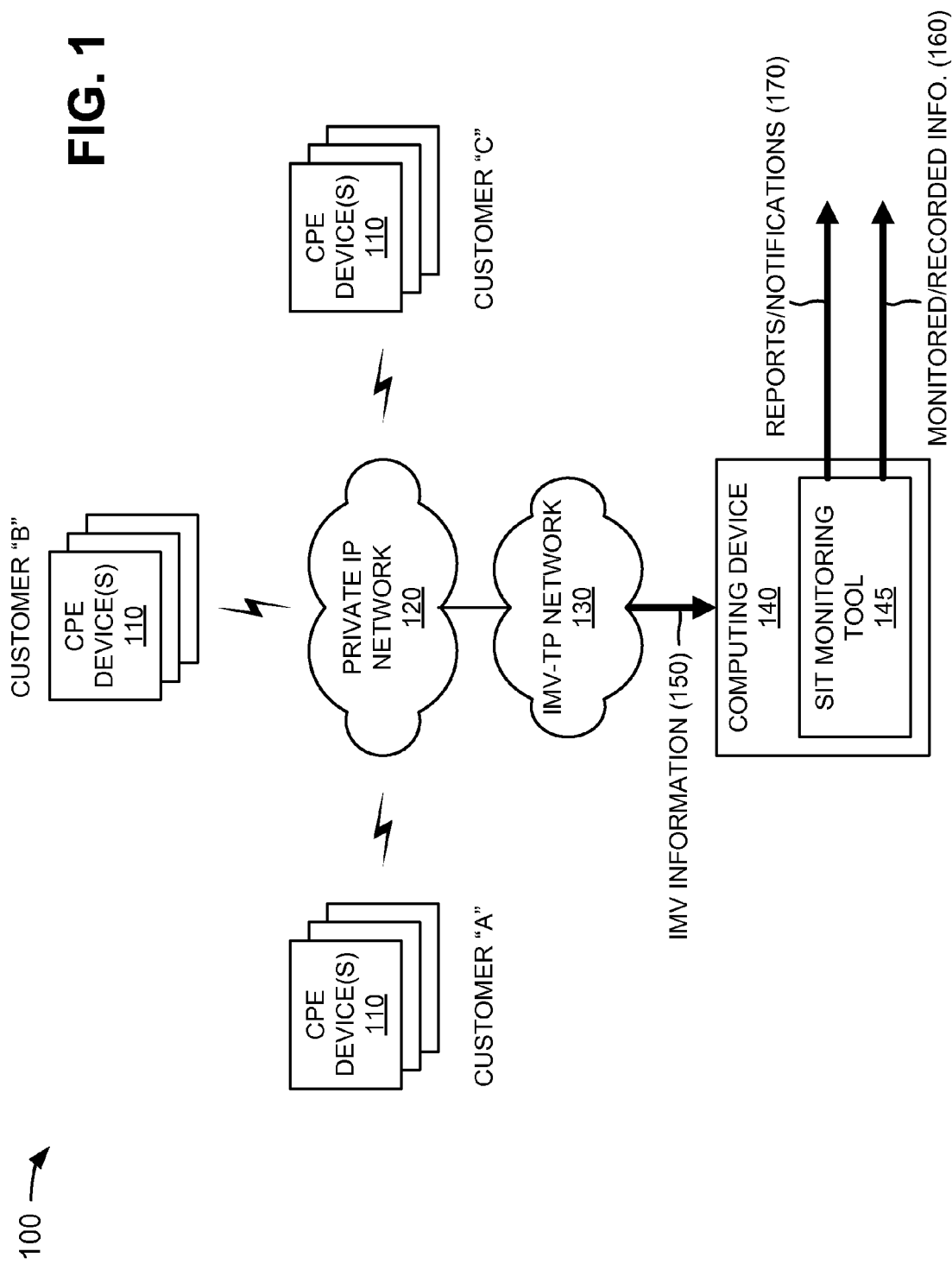
FIG. 1 is a diagram of an example network in which systems and/or methods described herein may be implemented.

FIG. 1 is a diagram of an example network 100 in which systems and/or methods described herein may be implemented. As illustrated, network 100 may include CPE devices 110 associated with three customers (e.g., "Customer A," "Customer B," and "Customer C"), a private IP network 120, an IMV-TP network 130, and a computing device 140 (e.g., that includes a SIT monitoring tool 145). Components of network 100 may interconnect via wired and/or wireless connections or links. Multiple CPE devices 110, one private IP network 120, one IMV-TP network 130, one computing device 140, and one SIT monitoring tool 145 have been illustrated in FIG. 1 for simplicity. In practice, there may be more CPE devices 110, private IP networks 120, IMV-TP networks 130, computing devices 140, and/or SIT monitoring tools 145. Also, in some instances, one or more of the components of network 100 may perform one or more functions described as being performed by another one or more of the components of network 100.

Each of CPE devices 110 may include any equipment provided at the premises of a customer that may enable the customer to implement IMV-TP (e.g., to provide HD video conferencing with other customers). For example, CPE devices 110 may include televisions, digital video recorders (DVRs), set-top boxes (STBs), radiotelephones, personal communications system (PCS) terminals (e.g., that may combine a cellular radiotelephone with data processing and data communications capabilities), personal digital assistants (PDAs) (e.g., that can include a radiotelephone, a pager, Internet/intranet access, etc.), wireless devices, smart phones, laptop computers, global positioning system (GPS) devices, content recording devices (e.g., cameras, video cameras, etc.), personal computers, tablet computers, speakers, microphones, projectors, etc. As further shown in FIG. 1, one or more CPE devices 110 may be associated with a first location (e.g., "Customer A"), with a second location (e.g., "Customer B"), and/or a third location (e.g., "Customer C").

Private IP network 120 may include a local area network (LAN), a wide area network (WAN), a metropolitan area network (MAN), a telephone network, such as the Public Switched Telephone Network (PSTN), an intranet, the Internet, an optical fiber (or fiber optic)-based network, a SIP-based network, or a combination of networks. In one example implementation, private IP network 120 may include an IP-based network that securely connects CPE device(s) 110 provided at one location with CPE device(s) 110 provided at other locations.

IMV-TP network 130 may include a network of different technologies, protocols, servers, software, and/or devices that provide HD video conferencing between customers (e.g., between CPE devices 110 provided at different locations). QoS may be achieved in IMV-TP network 130 with appropriate traffic marking, classification, and conditioning (e.g., queuing, shaping, policing, etc.). IMV-TP network 130 may utilize SIP over TCP for media signaling. Codecs (e.g., for CPE device 110 and network device interactions) may be provided in IMV-TP network 130 for voice, video, and data collaboration (e.g., PowerPoint presentation sharing). MPEG 4 video and G.711 and/or G.729 voice Codecs may provide a fully immersive experience through full motion HD video and uncompressed voice.

IMV-TP network 130 may support point-to-point (P2P) and multi-point (MP) calls with CPE devices 110 located at customer locations (e.g., in customer video conferencing rooms). IMV-TP network 130 may permit meeting participants to focus on their meeting, rather than on technology, by integrating cameras, microphones, speakers, projectors, and other technology into the video conferencing room. IMV-TP network 130 may provide data collaboration by transmitting data (e.g., a presentation, a document, etc.) along with audio and video to CPE devices 110. The received data may be displayed via a multi-screen video presentation integrated into a conference room. This may permit receiving participants to view the material without looking away from a presenter of the material. Further details of IMV-TP network 130 are provided below in connection with, for example, FIG. 3.

Computing device 140 may include one or more computation or communication devices, that gather, process, and/or provide information in a manner described herein. In one example, computing device 140 may include a server device, a laptop computer, a personal computer, a workstation computer, etc. As shown in FIG. 1, computing device 140 may receive IMV information 150 from IMV-TP network 130. IMV information 150 may include, for example, information about systems; protocols (e.g., SIP, TCP, etc.); servers (e.g., telepresence multipoint switches (TMSs), utility servers, etc.); software (e.g., IOS software, UNIX, Windows, etc.); devices (e.g., network devices, such as switches, routers, etc.); etc. associated with IMV-TP network 130. Computing device 140 may provide IMV information 150 to SIT monitoring tool 145.

SIT monitoring tool 145 may include software that, when executed by hardware components of computing device 140, enables computing device 140 to utilize IMV information 150 to generate monitored/recorded information 160 and/or reports/notifications information 170. Monitored/recorded information 160 may include information, such as scripts associated with IMV-TP network 130; custom key indicator (CKI) information associated with routers and/or switches provided in IMV-TP network 130; CKI information associated with servers provided in IMV-TP network 130; backup/storage information associated with IMV-TP network 130; IOS severity log information associated with IMV-TP network 130; server severity log information associated with IMV-TP network 130; etc. Reports/notifications information 170 may include one or more reports, notifications, alarms, etc. generated based on monitored/recorded information 160.

In one example implementation, computing device 140 (e.g., via SIT monitoring tool 145) may schedule monitoring of IMV-TP network 130, and may receive, based on the schedule, IMV information 150 directly from device(s), software, system(s), etc. associated with IMV-TP network 130. Computing device 140 (e.g., via SIT monitoring tool 145) may aggregate the received IMV information 150, may generate one or more reports 170 based on the aggregated IMV information 150, and may provide the generated one or more reports 170 to user(s) associated with IMV-TP network 130. Computing device 140 (e.g., via SIT monitoring tool 145) may generate one or more notifications 170 based on the generated report(s) 170, and may provide the generated notification(s) 170 to user(s) associated with IMV-TP network 130.

Although FIG. 1 shows example components of network 100, in other implementations, network 100 may contain fewer components, different components, differently arranged components, or additional components than depicted in FIG. 1.

Figure 2:
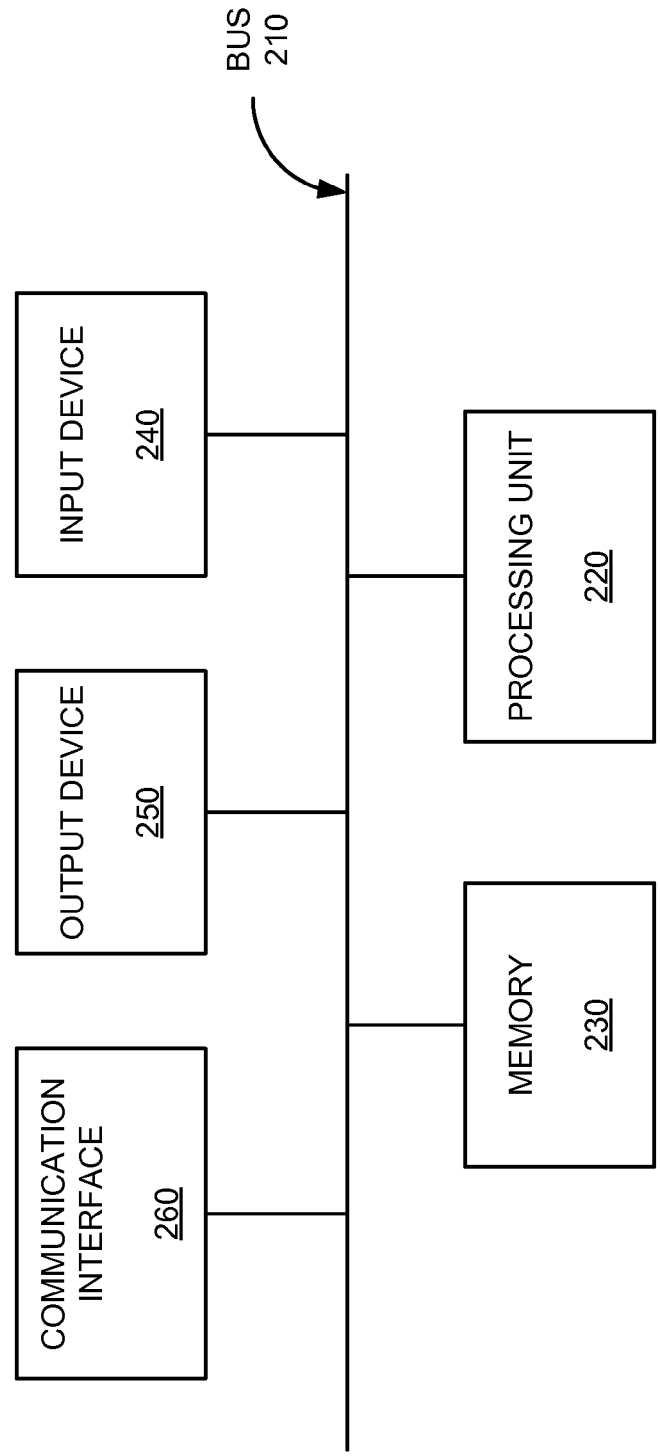
FIG. 2 is a diagram of example components of one or more devices of the network depicted in FIG. 1.

FIG. 2 is a diagram of example components of a device 200 that may correspond to one of the devices (e.g., CPE device 110 or computing device 140) of network 100. In one example implementation, device 200 may correspond to one or more devices of IMV-TP network 130 depicted in FIG. 3. As illustrated, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more ASICs, FPGAs, or the like.

Memory 230 may include a RAM or another type of dynamic storage device that stores information and instructions for execution by processing unit 220, a ROM or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include any transceiver-like mechanism that enables device 200 to communicate with other devices and/or systems. For example, communication interface 360 may include mechanisms for communicating with other devices, such as other devices of network 100.

As described herein, device 200 may perform certain operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via a communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

Figure 3:
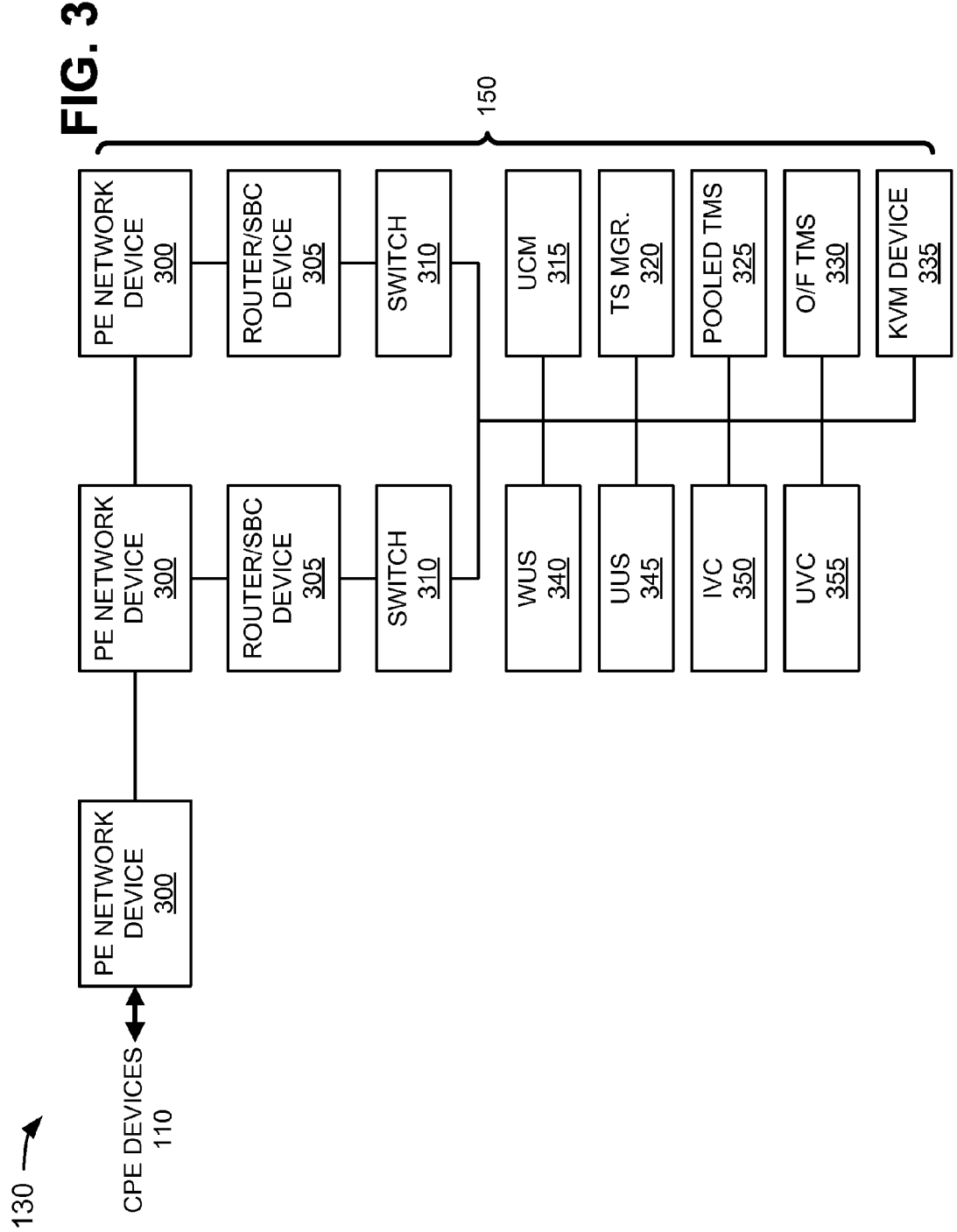
FIG. 3 is a diagram of example components of an IMV-TP network illustrated in FIG. 1.

FIG. 3 is a diagram of example components of IMV-TP network 130. As shown, IMV-TP network 130 may include provider edge (PE) network devices 300, router/session border control (SBC) devices 305, switches 310, a unified communications manager (UCM) 315, a telepresence scheduling (TS) manager 320, a pooled telepresence multipoint switch (TMS) 325, an overflow (O/F) TMS 330, a keyboard/video/mouse (KVM) device 335, a Windows utility server (WUS) 340, a UNIX utility server (UUS) 345, an immersive video controller (IVC) 350, and a unified video controller (UVC) 355. Components of IMV-TP network 130 may interconnect via wired and/or wireless connections or links. Three PE network devices 300, two router/SBC devices 305, two switches 310, one UCM 315, one TS manager 320, one pooled TMS 325, one overflow TMS 330, one KVM device 335, one WUS 340, one UUS 345, one IVC 350, and one UVC 355 have been illustrated in FIG. 1 for simplicity. In practice, there may be more PE network devices 300, router/SBC devices 305, switches 310, UCMs 315, TS managers 320, pooled TMSs 325, overflow TMSs 330, KVM devices 335, WUSs 340, UUSs 345, IVCs 350, and/or UVCs 355. Also, in some instances, one or more of the components of IVM-TP network 130 may perform one or more functions described as being performed by another one or more of the components of IVM-TP network 130.

Each of PE network devices 300 may include a traffic transfer device, such as a gateway, a router, a switch, a firewall, a network interface card (NIC), a hub, a bridge, a proxy server, an optical add/drop multiplexer (OADM), or some other type of device that processes and/or transfers traffic. In one example, each of PE network devices 300 may include a device that is capable interconnecting CPE devices 110 with private IP network 120 and/or IMV-TP network 130.

Each of router/SBC devices 305 may include a traffic transfer device, such as a router, that provides SBC functionality for IMV-TP network 130. Router/SBC device 305 may enable signaling and audio/video flow between customers without the need for the customer to have SIP-aware devices. Router/SBC device 305 may provide call admission control (CAC) that enables IMV-TP network 130 to keep track of how many simultaneous IMV sessions can be handled by a customer at a particular time, and to reject calls over a particular limit (e.g., to preserve the end user experience). Router/SBC device 305 may provide topology hiding that enables IMV-TP network 130 to hide IP addresses of call control and media elements from customers, which may reduce the possibility of denial of service (DoS) attacks on IMV-TP network 130. Router/SBC device 305 may provide call rate limiting that prevents call control elements of IMV-TP network 130 from being flooded with calls over a prescribed limit that could potentially cause adverse effects to IMV-TP network 130. Router/SBC device 305 may provide SIP header filtering to forward a list of known SIP headers and to protect call control elements of IMV-TP network 130 from malformed SIP messages that could potentially affect IMV-TP network 130.

Each of switches 310 may include a traffic transfer device, such as a switch, that enables traffic to be switched between one or more of UCM 315, TS manager 320, pooled TMS 325, overflow TMS 330, KVM device 335, WUS 340, UUS 345, IVC 350, and/or UVC 355. In one example, switch 310 may include a ten gigabit (Gb) Ethernet interface with a corresponding router/SBC device 305.

UCM 315 may include one or more server devices, or other types of computation or communication devices, that gather, process, search, and/or provide information in a manner described herein. For example, UCM 315 may include an enterprise-class IP telephony call-processing system that provides traditional telephony features, as well as advanced capabilities, such as video, mobility, presence, preference, and full-featured conferencing services. UCM 315 may act as a centralized "routing" entity that routes calls between customers, may implement a policy that permits intercompany calls using a phone number directory, and may permit basic reporting on utilization of IMV-TP network 130.

TS manager 320 may include one or more server devices, or other types of computation or communication devices, that gather, process, search, and/or provide information in a manner described herein. For example, TS manager 320 may enable scheduling, initiation, and management of IMV sessions. TS manager 320 may manage conference resources for various telepresence meeting types (e.g., P2P, MP, interoperability, intercompany, etc.), and may provide network administrators and help desk staff with system connectivity and management dashboards for reporting about IMV-TP network 130. TS manager 320 may generate usage, productivity, and return on investment (ROI) reports, and may help reduce total cost of ownership by integrating with existing infrastructure. In one example implementation, TS manager 320 may be associated with one or more of the customers (e.g., and/or CPE device(s) 110).

Pooled TMS 325 may include one or more network devices (e.g., switches), server devices, or other types of computation or communication devices, that gather, process, search, and/or provide information in a manner described herein. For example, pooled TMS 325 may enable three or more locations to participate in a single meeting, and may permit all participants to be seen in life-size, HD video and heard in CD-quality, spatial audio with no perceivable latency. Pooled TMS 325 may deliver automatic voice-activated switching, either site by site or by individual table segment, and may provide video conferencing interoperability with H.323 and SIP video conferencing endpoints. Pooled TMS 325 may provide a latency of less than ten milliseconds for transparent switching between sites or segments during a multipoint call, and may provide web-based administration with role-based profiles for administrators at both group and department levels.

Overflow TMS 330 may include the features of pooled TMS 325. However, offload TMS 330 may be considered a spare or overflow TMS that may be used if pooled TMS 325 runs out of capacity.

KVM device 335 may include one or more input or output devices, server devices, or other types of computation or communication devices, that gather, process, search, and/or provide information in a manner described herein. For example, KVM device 335 may enable users to control two or more devices of IVM-TP network 130 (e.g., UCM 315, TS manager 320, pooled TMS 325, overflow TMS 330, WUS 340, UUS 345, IVC 350, and/or UVC 355) from a single keyboard, video monitor, and/or mouse.

WUS 340 may include one or more server devices, or other types of computation or communication devices, that gather, process, search, and/or provide information in a manner described herein. For example, WUS 340 may receive information compiled in log files generated by Windows-based devices and/or software. WUS 340 may aggregate and format the log files into a format usable by computing device 140 and other computational servers. WUS 340 may also perform computations using data from the log files. In one example implementation, SIT monitoring tool 145 may be provided in and executed by WUS 340.

UUS 345 may include one or more server devices, or other types of computation or communication devices, that gather, process, search, and/or provide information in a manner described herein. For example, UUS 345 may receive information compiled in log files generated by UNIX (or LINUX)-based devices and/or software. UUS 345 may aggregate and format the log files into a format usable by computing device 140 and other computational servers. UUS 345 may also perform computations using data from the log files. In one example implementation, SIT monitoring tool 145 may be provided in and executed by UUS 345.

IVC 350 may include one or more server devices, or other types of computation or communication devices, that gather, process, search, and/or provide information in a manner described herein. For example, IVC 350 may enable scheduling of video conferences between one or more customers; may validate identifier codes associated with customers, video conferences, CPE devices 110, etc.; and may enable video conferencing services provided by IMV-TP network 130 to be billed to appropriate customers.

UVC 355 may include one or more server devices, or other types of computation or communication devices, that gather, process, search, and/or provide information in a manner described herein. For example, UVC 355 may provide a flexible, HD video conferencing solution that lets organizations easily conduct face-to-face discussions in multiparty virtual meetings. UVC 355 may support a broad range of video endpoints from HD and telepresence systems to standard-definition (SD) clients. UVC 355 may control video services provided by IMV-TP network 130 between CPE devices 110 of two or more customers.

As further shown in FIG. 3, one or more of PE network devices 300, router/SBC devices 305, switches 310, UCM 315, TS manager 320, pooled TMS 325, overflow TMS 330, KVM device 335, WUS 340, UUS 345, IVC 350, and/or UVC 355; or software or protocols associated with such devices, may generate IVM information 150 that is provided to computing device 140.

Although FIG. 3 shows example components of IMV-TP network 130, in other implementations, IMV-TP network 130 may contain fewer components, different components, differently arranged components, or additional components than depicted in FIG. 3.

Figure 4:
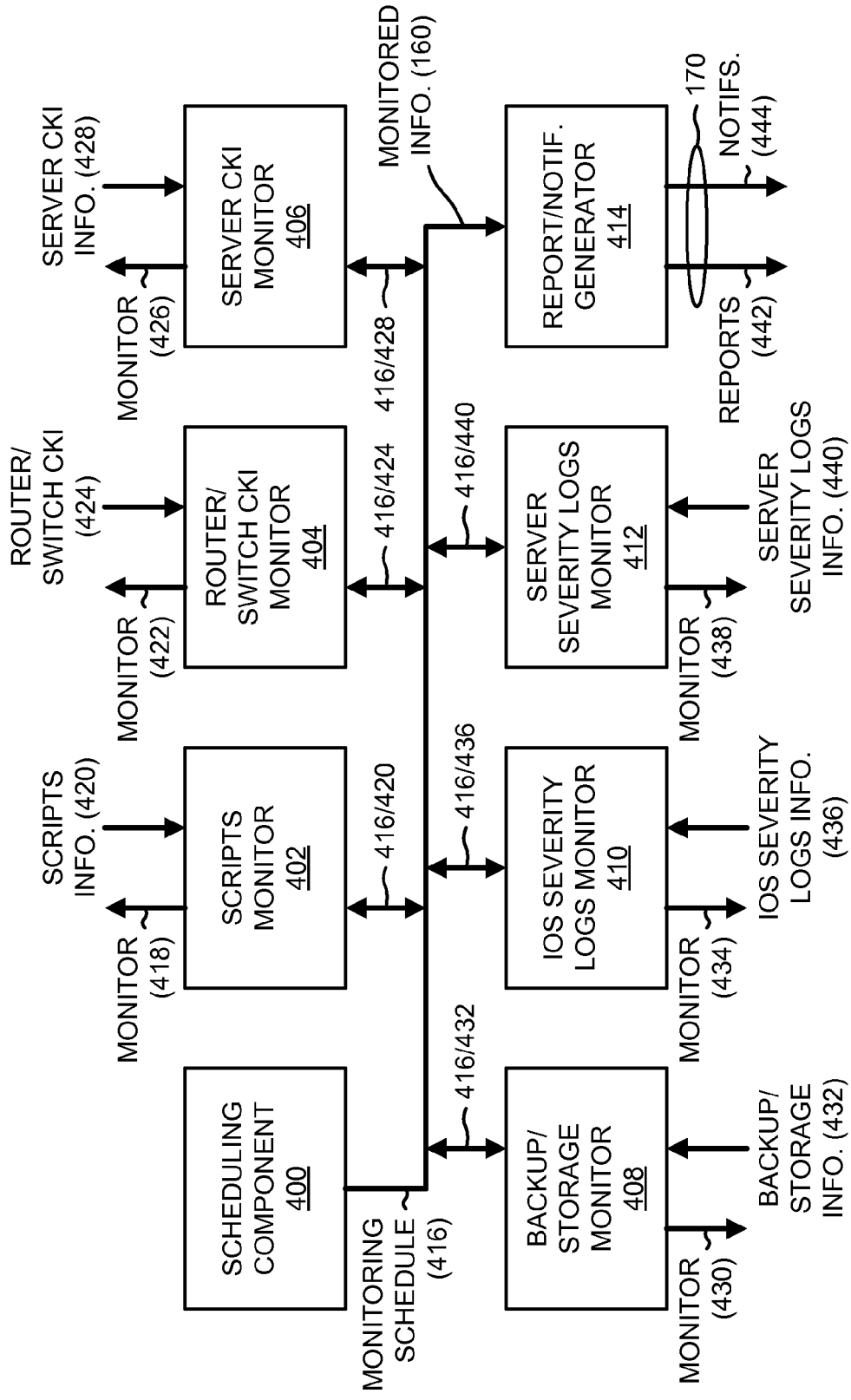
FIG. 4 is a diagram of example functional components of a system integration and testing (SIT) monitoring tool of a computing device shown in FIG. 1.

FIG. 4 is a diagram of example functional components of SIT monitoring tool 145. As illustrated, SIT monitoring tool 145 may include a scheduling component 400, a scripts monitor 402, a router/switch CKI monitor 404, a server CKI monitor 406, a backup/storage monitor 408, an IOS severity logs monitor 410, a server severity logs monitor 412, and a report/notification generator 414. In one example implementation, the functions described in connection with FIG. 4 may be performed by one or more of the example components of device 200 (FIG. 2).

Scheduling component 400 may include hardware or a combination of hardware and software that may determine a monitoring schedule 416 for scripts monitor 402, router/switch CKI monitor 404, server CKI monitor 406, backup/storage monitor 408, IOS severity logs monitor 410, and server severity logs monitor 412. Monitoring schedule 416 may include a schedule that causes components 402-412 to monitor IMV-TP network 130 at a specific time; a schedule that causes one or more of components 402-412 to monitor IMV-TP network 130 at different times; a schedule that causes one or more of components 402-412 to monitor IMV-TP network 130 based on an occurrence of an event(s) in IMV-TP network 130; a schedule that causes one or more of components 402-412 to continuously monitor IMV-TP network 130; etc. Monitoring schedule 416 may be automatically generated by SIT monitoring tool 145 or may be input to SIT monitoring tool 145 (e.g., by a user). Scheduling component 400 may provide monitoring schedule 416 to components 402-412.

Scripts monitor 402 may include hardware or a combination of hardware and software that may receive monitoring schedule 416 from scheduling component 400, and may monitor (e.g., based on monitoring schedule 416) router/SBC devices 305 and/or switches 310 for information relating to scripts that are executed by router/SBC devices 305 and/or switches 310, as indicated by reference number 418. Based on monitoring 418, router/SBC devices 305 and/or switches 310 may return scripts information 420 to scripts monitor 402. Scripts information 420 may include configuration information associated with router/SBC devices 305 and/or switches 310 (e.g., obtained via customizable scripts); initialization information associated with router/SBC devices 305 and/or switches 310 (e.g., obtained via customizable scripts); etc. Alternatively, scripts monitor 402 may generate scripts information 420, and may provide scripts information 420 to router/SBC devices 305 and/or switches 310 in order to monitor and retrieve information associated with router/SBC devices 305 and/or switches 310. As further shown in FIG. 4, scripts monitor 402 may provide scripts information 420 to report/notification generator 414.

Router/switch CKI monitor 404 may include hardware or a combination of hardware and software that may receive monitoring schedule 416 from scheduling component 400, and may monitor (e.g., based on monitoring schedule 416) router/SBC devices 305 and/or switches 310 for router/switch CKI information, as indicated by reference number 422. Based on monitoring 422, router/SBC devices 305 and/or switches 310 may return router/switch CKI information 424 to router/switch CKI monitor 404. Router/switch CKI information 424 may include information about the overall health of router/SBC devices 305 and/or switches 310; whether one or more of router/SBC devices 305 and/or switches 310 are operational; bandwidth availability associated with router/SBC devices 305 and/or switches 310; congestion associated with router/SBC devices 305 and/or switches 310; problems associated with router/SBC devices 305 and/or switches 310; etc. As further shown in FIG. 4, router/switch CKI monitor 404 may provide router/switch CKI information 424 to report/notification generator 414.

Server CKI monitor 406 may include hardware or a combination of hardware and software that may receive monitoring schedule 416 from scheduling component 400, and may monitor (e.g., based on monitoring schedule 416) one or more of servers 315-355 (e.g., UCM 315, TS manager 320, pooled TMS 325, offload TMS 330, KVM device 335, WUS 340, UUS 345, IVC 350, and/or UVC 355) for server CKI information, as indicated by reference number 426. Based on monitoring 426, one or more of servers 315-355 may return server CM information 428 to server CKI monitor 406. Server CKI information 428 may include information about the overall health of one or more of servers 315-355; whether one or more of servers 315-355 are operational; bandwidth availability associated with one or more of servers 315-355; congestion associated with one or more of servers 315-355; problems associated with one or more of servers 315-355; etc. As further shown in FIG. 4, server CKI monitor 406 may provide server CKI information 428 to report/notification generator 414.

Backup/storage monitor 408 may include hardware or a combination of hardware and software that may receive monitoring schedule 416 from scheduling component 400, and may monitor (e.g., based on monitoring schedule 416) router/SBC devices 305 and/or switches 310 for backup/storage information, as indicated by reference number 430. Based on monitoring 430, router/SBC devices 305 and/or switches 310 may return backup/storage information 432 to backup/storage monitor 408. Backup/storage information 432 may include backup information associated with one or more of router/SBC devices 305 and/or switches 310; storage information associated with one or more of router/SBC devices 305 and/or switches 310; network management information associated with one or more of router/SBC devices 305 and/or switches 310; health information associated with router/SBC devices 305 and/or switches 310 (e.g., determined at a particular point in time); etc. As further shown in FIG. 4, backup/storage monitor 408 may provide backup/storage information 432 to report/notification generator 414.

IOS severity logs monitor 410 may include hardware or a combination of hardware and software that may receive monitoring schedule 416 from scheduling component 400, and may monitor (e.g., based on monitoring schedule 416) router/SBC devices 305 and/or switches 310 for IOS severity logs information, as indicated by reference number 434. Based on monitoring 434, one or more of router/SBC devices 305 and/or switches 310 may return IOS severity logs information 436 to IOS severity logs monitor 410. IOS severity logs information 436 may include information associated with IOS severity logs (e.g., logs providing an indication of severe errors occurring in one or more of router/SBC devices 305 and/or switches 310); information associated with bandwidth logs (e.g., logs providing an indication of bandwidth usage by or bandwidth problems experienced by one or more of router/SBC devices 305 and/or switches 310); information associated with crash logs (e.g., logs providing an indication of hardware problems associated with one or more of router/SBC devices 305 and/or switches 310); information associated with border gateway (BGP) call processing logs (e.g., logs providing an indication of routes and paths of calls through one or more of router/SBC devices 305 and/or switches 310); etc. As further shown in FIG. 4, IOS severity logs monitor 410 may provide IOS severity logs information 436 to report/notification generator 414.

Server severity logs monitor 412 may include hardware or a combination of hardware and software that may receive monitoring schedule 416 from scheduling component 400, and may monitor (e.g., based on monitoring schedule 416) one or more of servers 315-355 for server severity logs information, as indicated by reference number 438. Based on monitoring 438, one or more of servers 315-355 may return server severity logs information 440 to server severity logs monitor 412. Server severity logs information 440 may include information associated with server severity logs (e.g., logs providing an indication of severe errors occurring in one or more of servers 315-355); information associated with crash logs (e.g., logs providing an indication of hardware problems associated with one or more of servers 315-355); information associated with call processing logs (e.g., logs providing an indication of routes and paths of calls through one or more of servers 315-355); information associated with freeze replication logs (e.g., logs providing an indication of replicated conference calls scheduled on IVC 350); information associated with call detail record (CDR) logs (e.g., logs providing billing information, timestamps, features, identifiers, etc. associated with one or more of servers 315-355); etc. As further shown in FIG. 4, server severity logs monitor 412 may provide server severity logs information 440 to report/notification generator 414.

Report/notification generator 414 may include hardware or a combination of hardware and software that may receive monitored information 160 (e.g., scripts information 420, router/switch CKI information 424, server CKI information 428, backup/storage information 432, IOS severity logs information 436, and/or server severity logs information 440), and may aggregate monitored information 160. Report/notification generator 414 may generate one or more reports 442 based on the aggregated monitored information 160, and may provide reports 442 to users (e.g., network administrators) associated with IMV-TP network 130. Report/notification generator 414 may generate one or more notifications 444 based on reports 442 (e.g., notifications 444 may include reports 442), and may provide notifications 444 to users associated with IMV-TP network 130. In one example implementation, notifications 444 may be provided to the users at a predetermined time. In another implementation, notifications 444 may be immediately provided to the users based on triggers or problems associated with IMV-TP network 130 (e.g., IMV-TP network 130 may be malfunctioning). As further shown in FIG. 4, reports 442 and notifications 444 may correspond to reports/notifications 170 (FIG. 1).

Although FIG. 4 shows example functional components of SIT monitoring tool 145, in other implementations, SIT monitoring tool 145 may include fewer functional components, different functional components, differently arranged functional components, or additional functional components than depicted in FIG. 4. Alternatively, or additionally, one or more functional components of SIT monitoring tool 145 may perform one or more other tasks described as being performed by one or more other functional components of SIT monitoring tool 145.

Figure 5:
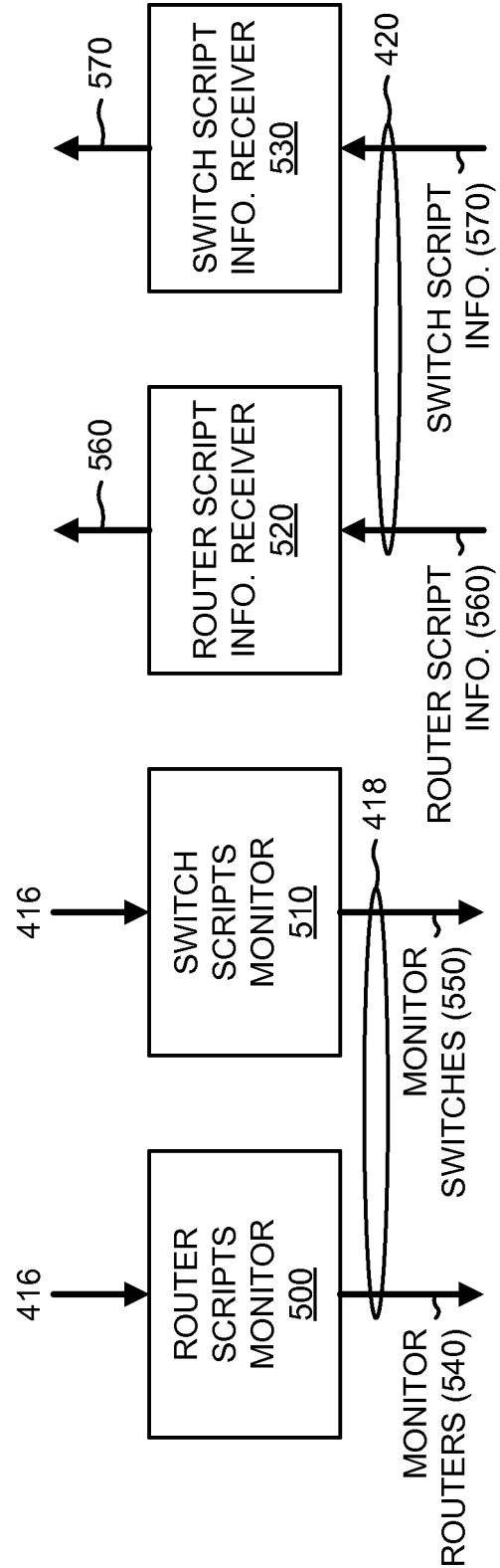
FIG. 5 is a diagram of example functional components of a scripts monitor of the SIT monitoring tool shown in FIG. 4.

FIG. 5 is a diagram of example functional components of scripts monitor 402. As illustrated, scripts monitor 402 may include a router scripts monitor 500, a switch scripts monitor 510, a router script information receiver 520, and a switch script information receiver 530. In one example implementation, the functions described in connection with FIG. 5 may be performed by one or more of the example components of device 200 (FIG. 2).

Router scripts monitor 500 may include hardware or a combination of hardware and software that may receive monitoring schedule 416 from scheduling component 400, and may monitor (e.g., based on monitoring schedule 416) router/SBC devices 305 for scripts information, as indicated by reference number 540.

Switch scripts monitor 510 may include hardware or a combination of hardware and software that may receive monitoring schedule 416 from scheduling component 400, and may monitor (e.g., based on monitoring schedule 416) switches 310 for scripts information, as indicated by reference number 550. As further shown in FIG. 5, monitoring 540 and 550 may correspond to monitoring 418.

Router script information receiver 520 may include hardware or a combination of hardware and software that may receive (e.g., based on monitoring 540) router script information 560 from router/SBC devices 305. Router script information 560 may include configuration information associated with router/SBC devices 305; initialization information associated with router/SBC devices 305; etc. Router script information receiver 520 may provide router script information 560 to report/notification generator 414.

Switch script information receiver 530 may include hardware or a combination of hardware and software that may receive (e.g., based on monitoring 550) switch script information 570 from switches 310. Switch script information 570 may include configuration information associated with switches 310; initialization information associated with switches 310; etc. Switch script information receiver 530 may provide switch script information 570 to report/notification generator 414. As further shown in FIG. 5, router script information 560 and switch script information 570 may correspond to scripts information 420.

Although FIG. 5 shows example functional components of scripts monitor 402, in other implementations, scripts monitor 402 may include fewer functional components, different functional components, differently arranged functional components, or additional functional components than depicted in FIG. 5. Alternatively, or additionally, one or more functional components of scripts monitor 402 may perform one or more other tasks described as being performed by one or more other functional components of scripts monitor 402.

Figure 6:
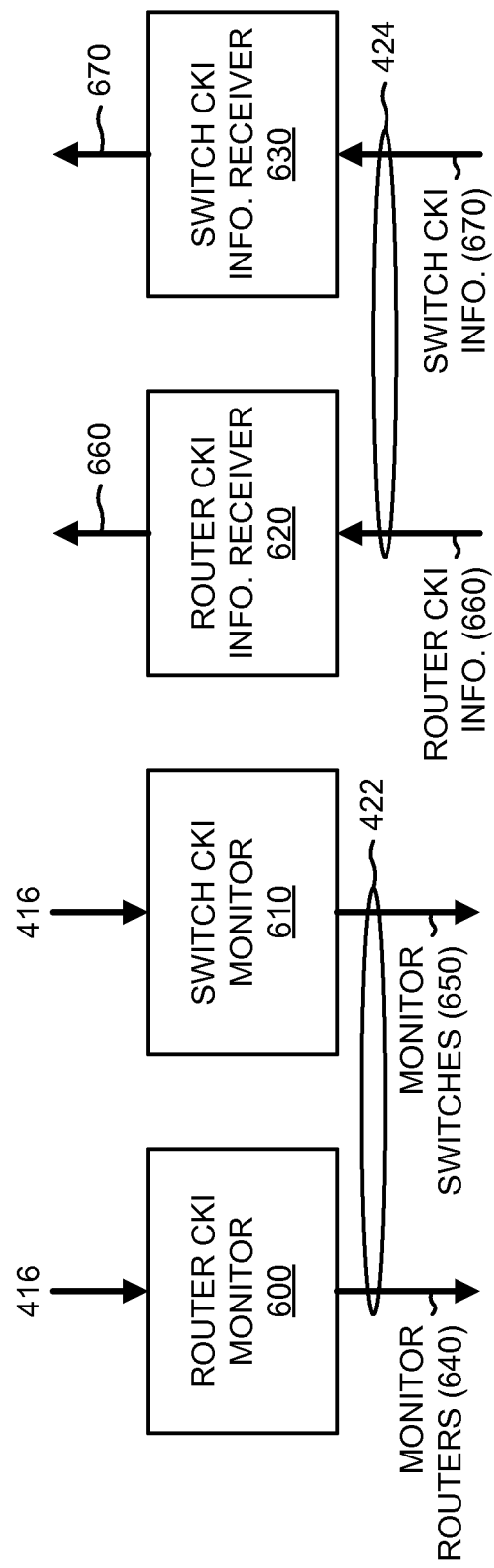
FIG. 6 is a diagram of example functional components of a router/switch custom key indicator (CKI) monitor of the SIT monitoring tool.

FIG. 6 is a diagram of example functional components of router/switch CKI monitor 404. As illustrated, router/switch CKI monitor 404 may include a router CKI monitor 600, a switch CKI monitor 610, a router CKI information receiver 620, and a switch CKI information receiver 630. In one example implementation, the functions described in connection with FIG. 6 may be performed by one or more of the example components of device 200 (FIG. 2).

Router CKI monitor 600 may include hardware or a combination of hardware and software that may receive monitoring schedule 416 from scheduling component 400, and may monitor (e.g., based on monitoring schedule 416) router/SBC devices 305 for CKI information, as indicated by reference number 640.

Switch CKI monitor 610 may include hardware or a combination of hardware and software that may receive monitoring schedule 416 from scheduling component 400, and may monitor (e.g., based on monitoring schedule 416) switches 310 for CKI information, as indicated by reference number 650. As further shown in FIG. 6, monitoring 640 and 650 may correspond to monitoring 422.

Router CKI information receiver 620 may include hardware or a combination of hardware and software that may receive (e.g., based on monitoring 640) router CKI information 660 from router/SBC devices 305. Router CKI information 660 may include information about the overall health of router/SBC devices 305; whether one or more of router/SBC devices 305 are operational; bandwidth availability associated with router/SBC devices 305; congestion associated with router/SBC devices 305; problems associated with router/SBC devices 305; etc. Router CKI information receiver 620 may provide router CKI information 660 to report/notification generator 414.

Switch CKI information receiver 630 may include hardware or a combination of hardware and software that may receive (e.g., based on monitoring 650) switch CKI information 670 from switches 310. Switch CKI information 670 may include information about the overall health of switches 310; whether one or more of switches 310 are operational; bandwidth availability associated with switches 310; congestion associated with switches 310; problems associated with switches 310; etc. Switch CKI information receiver 630 may provide switch CKI information 670 to report/notification generator 414. As further shown in FIG. 6, router CKI information 660 and switch CKI information 670 may correspond to router/switch CKI information 424.

Although FIG. 6 shows example functional components of router/switch CKI monitor 404, in other implementations, router/switch CKI monitor 404 may include fewer functional components, different functional components, differently arranged functional components, or additional functional components than depicted in FIG. 6. Alternatively, or additionally, one or more functional components of router/switch CKI monitor 404 may perform one or more other tasks described as being performed by one or more other functional components of router/switch CKI monitor 404.

Figure 7:
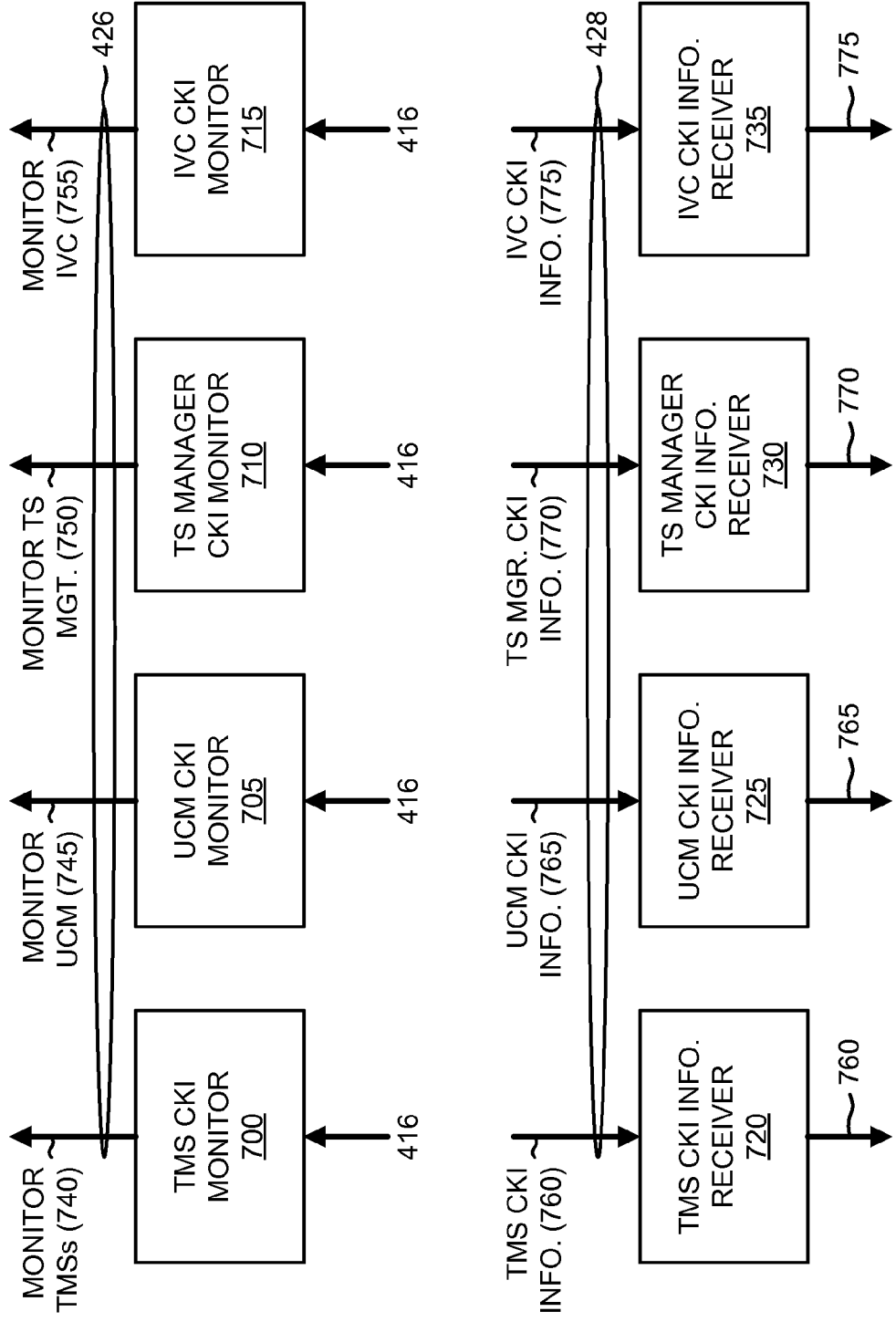
FIG. 7 is a diagram of example functional components of a server CKI monitor of the SIT monitoring tool.

FIG. 7 is a diagram of example functional components of server CKI monitor 406. As illustrated, server CKI monitor 406 may include a TMS CKI monitor 700, a UCM CKI monitor 705, a TS manager CKI monitor 710, an IVC CKI monitor 715, a TMS CKI information receiver 720, a UCM CKI information receiver 725, a TS manager CKI information receiver 730, and an IVC CKI information receiver 735. In one example implementation, the functions described in connection with FIG. 7 may be performed by one or more of the example components of device 200 (FIG. 2).

TMS CKI monitor 700 may include hardware or a combination of hardware and software that may receive monitoring schedule 416 from scheduling component 400, and may monitor (e.g., based on monitoring schedule 416) pooled TMS 325 and overflow TMS 330 for CKI information, as indicated by reference number 740.

UCM CKI monitor 705 may include hardware or a combination of hardware and software that may receive monitoring schedule 416 from scheduling component 400, and may monitor (e.g., based on monitoring schedule 416) UCM 315 for CKI information, as indicated by reference number 745.

TS manager CKI monitor 710 may include hardware or a combination of hardware and software that may receive monitoring schedule 416 from scheduling component 400, and may monitor (e.g., based on monitoring schedule 416) TS manager 320 for CKI information, as indicated by reference number 750.

IVC CKI monitor 715 may include hardware or a combination of hardware and software that may receive monitoring schedule 416 from scheduling component 400, and may monitor (e.g., based on monitoring schedule 416) IVC 350 for CKI information, as indicated by reference number 755. As further shown in FIG. 7, monitoring 740-755 may correspond to monitoring 426.

TMS CKI information receiver 720 may include hardware or a combination of hardware and software that may receive (e.g., based on monitoring 740) router CKI information 660 from pooled TMS 325 and/or overflow TMS 330. TMS CKI information 760 may include information about the overall health of pooled TMS 325 and/or overflow TMS 330; whether pooled TMS 325 and/or overflow TMS 330 are operational; bandwidth availability associated with pooled TMS 325 and/or overflow TMS 330; congestion associated with pooled TMS 325 and/or overflow TMS 330; problems associated with pooled TMS 325 and/or overflow TMS 330; etc. TMS CKI information receiver 720 may provide TMS CKI information 760 to report/notification generator 414.

UCM CKI information receiver 725 may include hardware or a combination of hardware and software that may receive (e.g., based on monitoring 745) UCM CKI information 765 from UCM 315. UCM CKI information 765 may include information about the overall health of UCM 315; whether UCM 315 is operational; bandwidth availability associated with UCM 315; congestion associated with UCM 315; problems associated with UCM 315; etc. UCM CKI information receiver 725 may provide UCM CKI information 765 to report/notification generator 414.

TS manager CKI information receiver 730 may include hardware or a combination of hardware and software that may receive (e.g., based on monitoring 750) TS manager CKI information 770 from TS manager 320. TS manager CKI information 770 may include information about the overall health of TS manager 320; whether TS manager 320 is operational; bandwidth availability associated with TS manager 320; congestion associated with TS manager 320; problems associated with TS manager 320; etc. TS manager CKI information receiver 730 may provide TS manager CKI information 770 to report/notification generator 414.

IVC CKI information receiver 735 may include hardware or a combination of hardware and software that may receive (e.g., based on monitoring 755) IVC CKI information 775 from IVC 350. IVC CKI information 775 may include information about the overall health of IVC 350; whether IVC 350 is operational; bandwidth availability associated with IVC 350; congestion associated with IVC 350; problems associated with IVC 350; etc. IVC CKI information receiver 735 may provide IVC CKI information 775 to report/notification generator 414. As further shown in FIG. 7, TMS CKI information 760, UCM CKI information 765, TS manager CKI information 770, and IVC CKI information 775 may correspond to server CKI information 428.

Although FIG. 7 shows example functional components of server CKI monitor 406, in other implementations, server CKI monitor 406 may include fewer functional components, different functional components, differently arranged functional components, or additional functional components than depicted in FIG. 7. For example, server CKI monitor 406 may include monitors and receivers to retrieve CKI information from other servers of IMS-TP network 130 (e.g., KVM device 335, WUS 340, UUS 345, and/or UVC 355). Alternatively, or additionally, one or more functional components of server CKI monitor 406 may perform one or more other tasks described as being performed by one or more other functional components of server CKI monitor 406.

Figure 8:
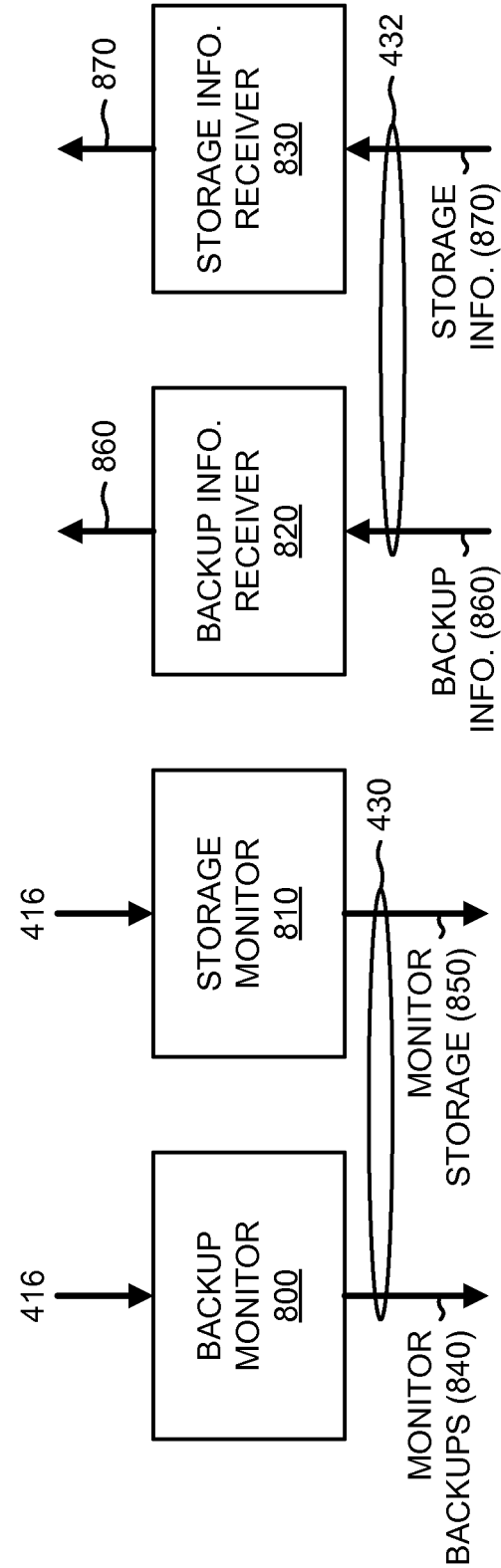
FIG. 8 is a diagram of example functional components of a backup/storage monitor of the SIT monitoring tool.

FIG. 8 is a diagram of example functional components of backup/storage monitor 408. As illustrated, backup/storage monitor 408 may include a backup monitor 800, a storage monitor 810, a backup information receiver 820, and a storage information receiver 830. In one example implementation, the functions described in connection with FIG. 8 may be performed by one or more of the example components of device 200 (FIG. 2).

Backup monitor 800 may include hardware or a combination of hardware and software that may receive monitoring schedule 416 from scheduling component 400, and may monitor (e.g., based on monitoring schedule 416) router/SBC devices 305 and/or switches 310 for backup information, as indicated by reference number 840.

Storage monitor 810 may include hardware or a combination of hardware and software that may receive monitoring schedule 416 from scheduling component 400, and may monitor (e.g., based on monitoring schedule 416) router/SBC devices 305 and/or switches 310 for storage information, as indicated by reference number 850. As further shown in FIG. 8, monitoring 840 and 850 may correspond to monitoring 430.

Backup information receiver 820 may include hardware or a combination of hardware and software that may receive (e.g., based on monitoring 840) backup information 860 from router/SBC devices 305 and/or switches 310. Backup information 860 may include backup information (e.g., backed up configuration information, generated errors, etc.) associated with one or more of router/SBC devices 305 and/or switches 310. Backup information receiver 820 may provide backup information 860 to report/notification generator 414.

Storage information receiver 830 may include hardware or a combination of hardware and software that may receive (e.g., based on monitoring 850) storage information 870 from router/SBC devices 305 and/or switches 310. Storage information 870 may include storage information associated with one or more of router/SBC devices 305 and/or switches 310; network management information associated with one or more of router/SBC devices 305 and/or switches 310; health information associated with router/SBC devices 305 and/or switches 310 (e.g., determined at a particular point in time); etc. Storage information receiver 830 may provide storage information 870 to report/notification generator 414. As further shown in FIG. 8, backup information 860 and storage information 870 may correspond to backup/storage information 432.

Although FIG. 8 shows example functional components of backup/storage monitor 408, in other implementations, backup/storage monitor 408 may include fewer functional components, different functional components, differently arranged functional components, or additional functional components than depicted in FIG. 8. Alternatively, or additionally, one or more functional components of backup/storage monitor 408 may perform one or more other tasks described as being performed by one or more other functional components of backup/storage monitor 408.

Figure 9:
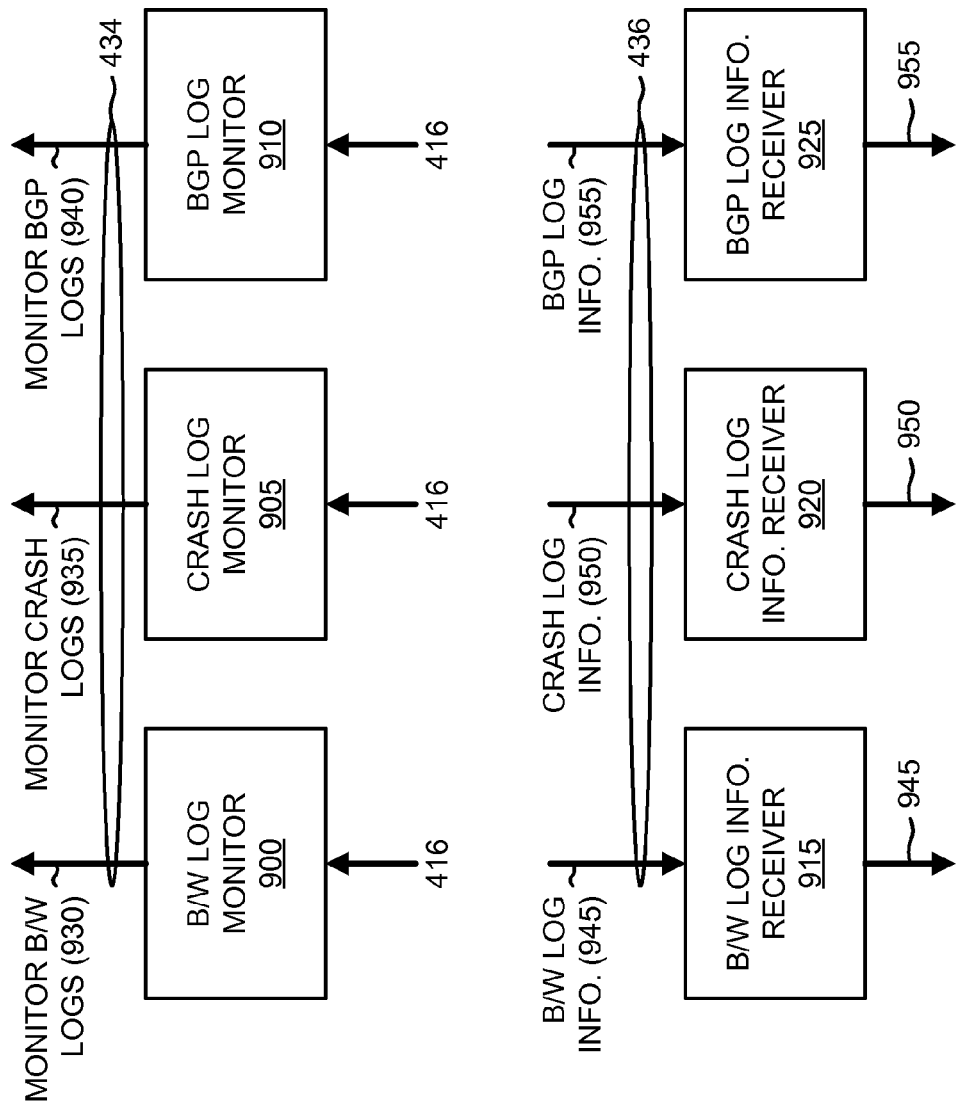
FIG. 9 is a diagram of example functional components of an internetwork operating system (IOS) severity logs monitor of the SIT monitoring tool.

FIG. 9 is a diagram of example functional components of IOS severity logs monitor 410. As illustrated, IOS severity logs monitor 410 may include a bandwidth log monitor 900, a crash log monitor 905, a BGP log monitor 910, a bandwidth log information receiver 915, a crash log information receiver 920, and a BGP log information receiver 925. In one example implementation, the functions described in connection with FIG. 9 may be performed by one or more of the example components of device 200 (FIG. 2).

Bandwidth log monitor 900 may include hardware or a combination of hardware and software that may receive monitoring schedule 416 from scheduling component 400, and may monitor (e.g., based on monitoring schedule 416) router/SBC devices 305 and/or switches 310 for bandwidth log information, as indicated by reference number 930.

Crash log monitor 905 may include hardware or a combination of hardware and software that may receive monitoring schedule 416 from scheduling component 400, and may monitor (e.g., based on monitoring schedule 416) router/SBC devices 305 and/or switches 310 for crash log information, as indicated by reference number 935.

BGP log monitor 910 may include hardware or a combination of hardware and software that may receive monitoring schedule 416 from scheduling component 400, and may monitor (e.g., based on monitoring schedule 416) router/SBC devices 305 and/or switches 310 for BGP log information, as indicated by reference number 940. As further shown in FIG. 9, monitoring 930-940 may correspond to monitoring 434.

Bandwidth log information receiver 915 may include hardware or a combination of hardware and software that may receive (e.g., based on monitoring 930) bandwidth log information 945 from router/SBC devices 305 and/or switches 310. Bandwidth log information 945 may include logs providing an indication of bandwidth usage by router/SBC devices 305 and/or switches 310, bandwidth problems experienced by router/SBC devices 305 and/or switches 310, etc. Bandwidth log information receiver 915 may provide bandwidth log information 945 to report/notification generator 414.

Crash log information receiver 920 may include hardware or a combination of hardware and software that may receive (e.g., based on monitoring 935) crash log information 950 from router/SBC devices 305 and/or switches 310. Crash log information 950 may include logs providing an indication of hardware problems associated with router/SBC devices 305 and/or switches 310, hardware debugging information associated with router/SBC devices 305 and/or switches 310, IOS severity logs providing an indication of severe errors occurring in router/SBC devices 305 and/or switches 310, etc. Crash log information receiver 920 may provide crash log information 950 to report/notification generator 414.

BGP log information receiver 925 may include hardware or a combination of hardware and software that may receive (e.g., based on monitoring 940) BGP log information 955 from router/SBC devices 305 and/or switches 310. BGP log information 955 may include BGP call processing logs providing an indication of routes and paths of calls through router/SBC devices 305 and/or switches 310, security problems (e.g., DoS attacks) associated with calls through router/SBC devices 305 and/or switches 310, etc. BGP log information receiver 925 may provide BGP log information 955 to report/notification generator 414. As further shown in FIG. 9, bandwidth log information 945, crash log information 950, and BGP log information 955 may correspond to IOS severity logs information 436.

Although FIG. 9 shows example functional components of IOS severity logs monitor 410, in other implementations, IOS severity logs monitor 410 may include fewer functional components, different functional components, differently arranged functional components, or additional functional components than depicted in FIG. 9. Alternatively, or additionally, one or more functional components of IOS severity logs monitor 410 may perform one or more other tasks described as being performed by one or more other functional components of IOS severity logs monitor 410.

Figure 10:
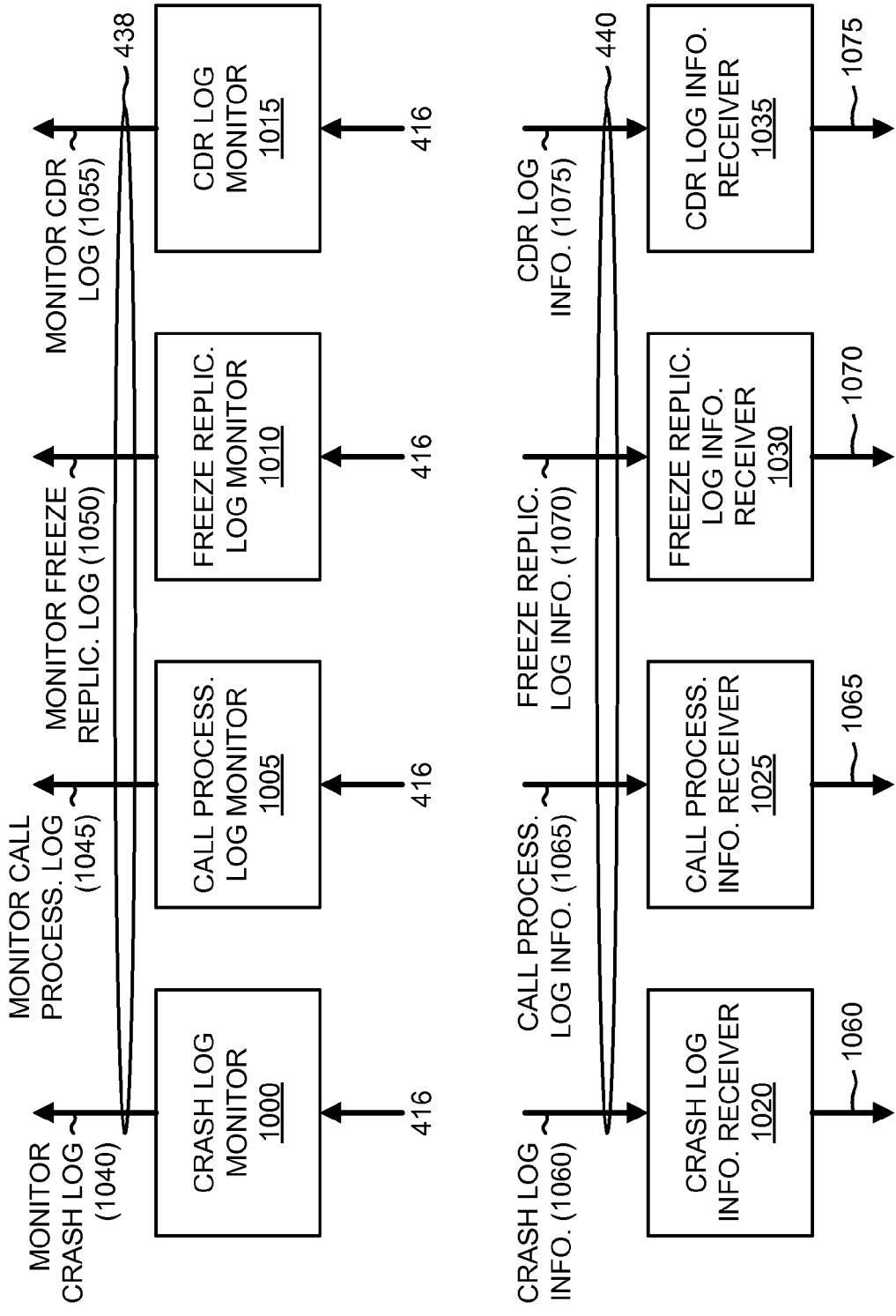
FIG. 10 is a diagram of example functional components of a server severity logs monitor of the SIT monitoring tool.

FIG. 10 is a diagram of example functional components of server severity logs monitor 412. As illustrated, server severity logs monitor 412 may include a crash log monitor 1000, a call processing log monitor 1005, a freeze replication log monitor 1010, a CDR log monitor 1015, a crash log information receiver 1020, a call processing log information receiver 1025, a freeze replication log information receiver 1030, and a CDR log information receiver 1035. In one example implementation, the functions described in connection with FIG. 10 may be performed by one or more of the example components of device 200 (FIG. 2).

Crash log monitor 1000 may include hardware or a combination of hardware and software that may receive monitoring schedule 416 from scheduling component 400, and may monitor (e.g., based on monitoring schedule 416) servers 315-355 for crash log information, as indicated by reference number 1040.

Call processing log monitor 1005 may include hardware or a combination of hardware and software that may receive monitoring schedule 416 from scheduling component 400, and may monitor (e.g., based on monitoring schedule 416) servers 315-355 for call processing log information, as indicated by reference number 1045.

Freeze replication log monitor 1010 may include hardware or a combination of hardware and software that may receive monitoring schedule 416 from scheduling component 400, and may monitor (e.g., based on monitoring schedule 416) servers 315-355 for freeze replication log information, as indicated by reference number 1050.

CDR log monitor 1015 may include hardware or a combination of hardware and software that may receive monitoring schedule 416 from scheduling component 400, and may monitor (e.g., based on monitoring schedule 416) servers 315-355 for CDR log information, as indicated by reference number 1055. As further shown in FIG. 10, monitoring 1040-1055 may correspond to monitoring 438.

Crash log information receiver 1020 may include hardware or a combination of hardware and software that may receive (e.g., based on monitoring 1040) crash log information 1060 from servers 315-355. Crash log information 1060 may include server severity logs providing an indication of severe errors occurring in one or more of servers 315-355, crash logs providing an indication of hardware problems associated with one or more of servers 315-355, etc. Crash log information receiver 1020 may provide crash log information 1060 to report/notification generator 414.

Call processing log information receiver 1025 may include hardware or a combination of hardware and software that may receive (e.g., based on monitoring 1045) call processing log information 1065 from servers 315-355. Call processing log information 1065 may include logs providing an indication of routes and paths of calls through one or more of servers 315-355, call initiation through servers 315-355, call setup through servers 315-355, etc. Call processing log information receiver 1025 may provide call processing log information 1065 to report/notification generator 414.

Freeze replication log information receiver 1030 may include hardware or a combination of hardware and software that may receive (e.g., based on monitoring 1050) freeze replication log information 1070 from servers 315-355. Freeze replication log information 1070 may include freeze replication logs providing an indication of replicated conference calls scheduled on IVC 350; logs providing information that ensures consistency between redundant resources (e.g., servers 315-355) to improve reliability, fault-tolerance, or accessibility; etc. Freeze replication log information receiver 1030 may provide freeze replication log information 1070 to report/notification generator 414.

CDR log information receiver 1035 may include hardware or a combination of hardware and software that may receive (e.g., based on monitoring 1055) CDR log information 1075 from servers 315-355. CDR log information 1075 may include CDR logs providing billing information, timestamps, features, identifiers, etc. associated with one or more of servers 315-355. CDR log information receiver 1035 may provide CDR log information 1075 to report/notification generator 414. As further shown in FIG. 10, crash log information 1060, call processing log information 1065, freeze replication log information 1070, and CDR log information 1075 may correspond to severity logs information 440.

Although FIG. 10 shows example functional components of server severity logs monitor 412, in other implementations, server severity logs monitor 412 may include fewer functional components, different functional components, differently arranged functional components, or additional functional components than depicted in FIG. 10. Alternatively, or additionally, one or more functional components of server severity logs monitor 412 may perform one or more other tasks described as being performed by one or more other functional components of server severity logs monitor 412.

Figure 11:
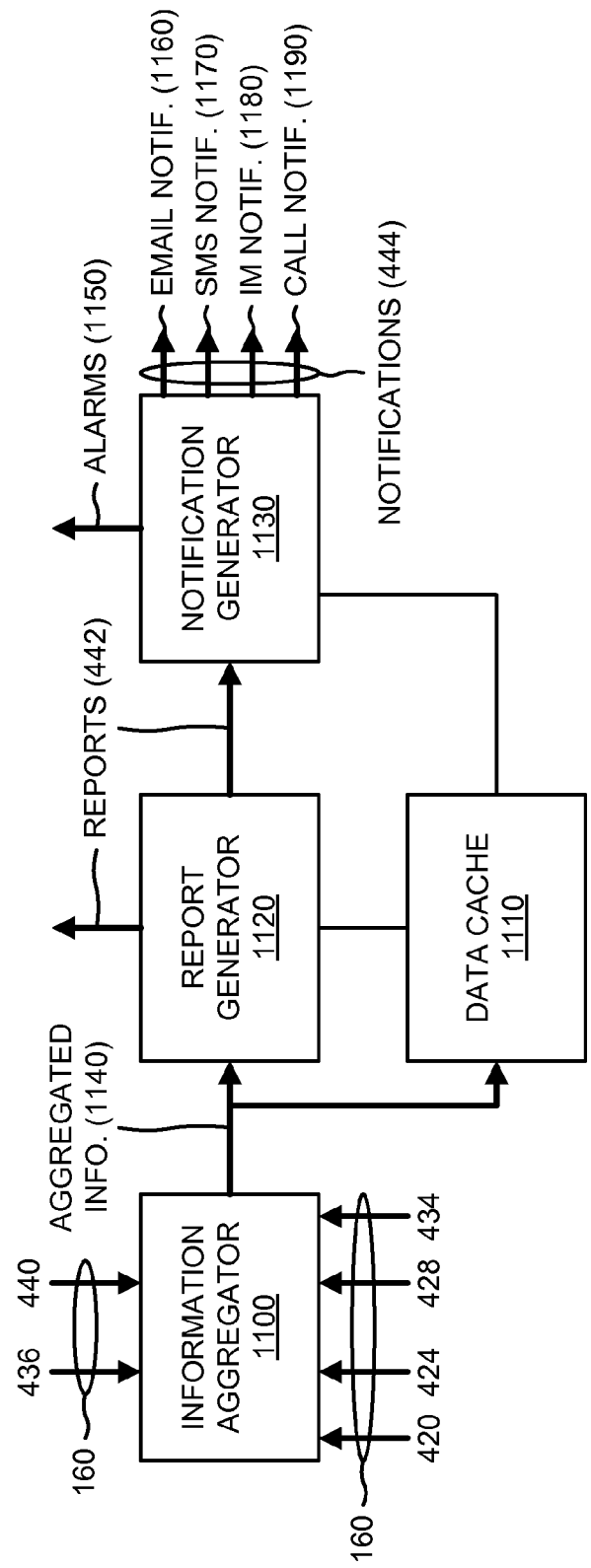
FIG. 11 is a diagram of example functional components of a report/notification generator of the SIT monitoring tool.

FIG. 11 is a diagram of example functional components of report/notification generator 414. As illustrated, report/notification generator 414 may include an information aggregator 1100, a data cache 1110, a report generator 1120, and a notification generator 1130. In one example implementation, the functions described in connection with FIG. 11 may be performed by one or more of the example components of device 200 (FIG. 2).

Information aggregator 1100 may include hardware or a combination of hardware and software that may receive scripts information 420, router/switch CKI information 424, server CKI information 428, backup/storage information 432, IOS severity logs information 436, and server severity logs information 440. As further shown in FIG. 11, such received information may correspond to monitored/recorded information 160 (FIG. 1). Information aggregator 1100 may aggregate information 420, 424, 428, 432, 436, and 440 into aggregated information 1140. Aggregated information 1140 may include, for example, combined information received from a particular device of IMS-TP network 130, combined information received for a particular test or command issued by SIT monitoring tool 145, etc. Information aggregator 1100 may provide aggregated information 1140 to data cache 1110 and report generator 1120.

Data cache 1110 may include one or more storage devices that may receive aggregated information 1140, may provide a time stamp for aggregated information 1140, and may store aggregated information 1140 along with the corresponding time stamp. In one example, data cache 1110 may label aggregated information 1140 according to a device (e.g., of IMV-TP network 130) under test, a test or a command issued by SIT monitoring tool 145, etc. If results exist in data cache 1140 for the device, the test, the command, etc., data cache 1140 may back up those results using a tagging system (e.g., a user-defined tagging system). Caching aggregated information 1140 in data cache 1110 may enable a user to compare results of subsequent executions of a particular command or test, obtain historical information pertaining to IMV-TP network 130 (or particular devices in IMV-TP network 130), perform root cause analysis on aggregated information 1140, perform data mining on aggregated information 1140, etc.

Report generator 1120 may include hardware or a combination of hardware and software that may receive aggregated information 1140, and may generate reports 442 based on aggregated information 1140 (and/or historical information retrieved from data cache 1110). Reports 442 may include, for example, reports about the performance (e.g., bandwidth usage, errors, down time, etc.) of a particular device(s) of IMV-TP network 130; reports about usage (e.g., a number of calls, costs, length of calls, etc.) of IMV-TP network 130 (or devices of IMV-TP network 130); reports about problems (e.g., hardware malfunctions, software malfunctions, etc.) experienced by IMV-TP network 130 over time; etc. Report generator 1120 may provide reports 442 to users (e.g., network administrators) associated with IMV-TP network 130, and may provide reports 442 to notification generator 1130.

Notification generator 1130 may include hardware or a combination of hardware and software that may receive reports 442 from report generator 1120, and may receive historical information (e.g., associated with IMV-TP network 130) from data cache 1110. Notification generator 1130 may compare the information provided in reports 442 (e.g., aggregated information 1140) with the historical information provided in data cache 1110 to determine any discrepancies between the two. If notification generator 1130 determines discrepancies based on the comparison, notification generator 1130 may provide one or more alarms 1150 to users associated with IMV-TP network 130. For example, if the comparison indicates that IVC 350 is not performing properly, notification generator 1130 may generate alarm 1150 indicating the problem with IVC 350. Based on alarms, the users of IMV-TP network 130 may correct any problems occurring in IMV-TP network 130.

Notification generator 1130 may generate one or more notifications 444 based on reports 442. Notifications 444 may include some or all of the information contained in reports 442 (e.g., notifications 444 may be tailored to particular users of IMV-TP network 130) and/or some or all of alarms 1150 generated by notification generator 1130. For example, if a particular user is responsible for maintaining WUS 340, the particular user may receive notifications 444 with information and/or alarms 1150 pertinent to WUS 340. As further shown in FIG. 11, notifications 444 may be provided in a variety of formats, such as email notifications 1160, short message service (SMS) notifications 1170, instant message (IM) notifications 1180, text-to-speech voice call notifications 1190, etc. Notification schemes may be dynamic and configurable on a per-user or per-group basis, and users may subscribe to receive notifications 444 from SIT monitoring tool 145. Each user may specify a desired notification level. If a particular user desires notification on a per-command basis, the particular user may adjust the notification level for any given command issued by SIT monitoring tool 145.

Figure 12:
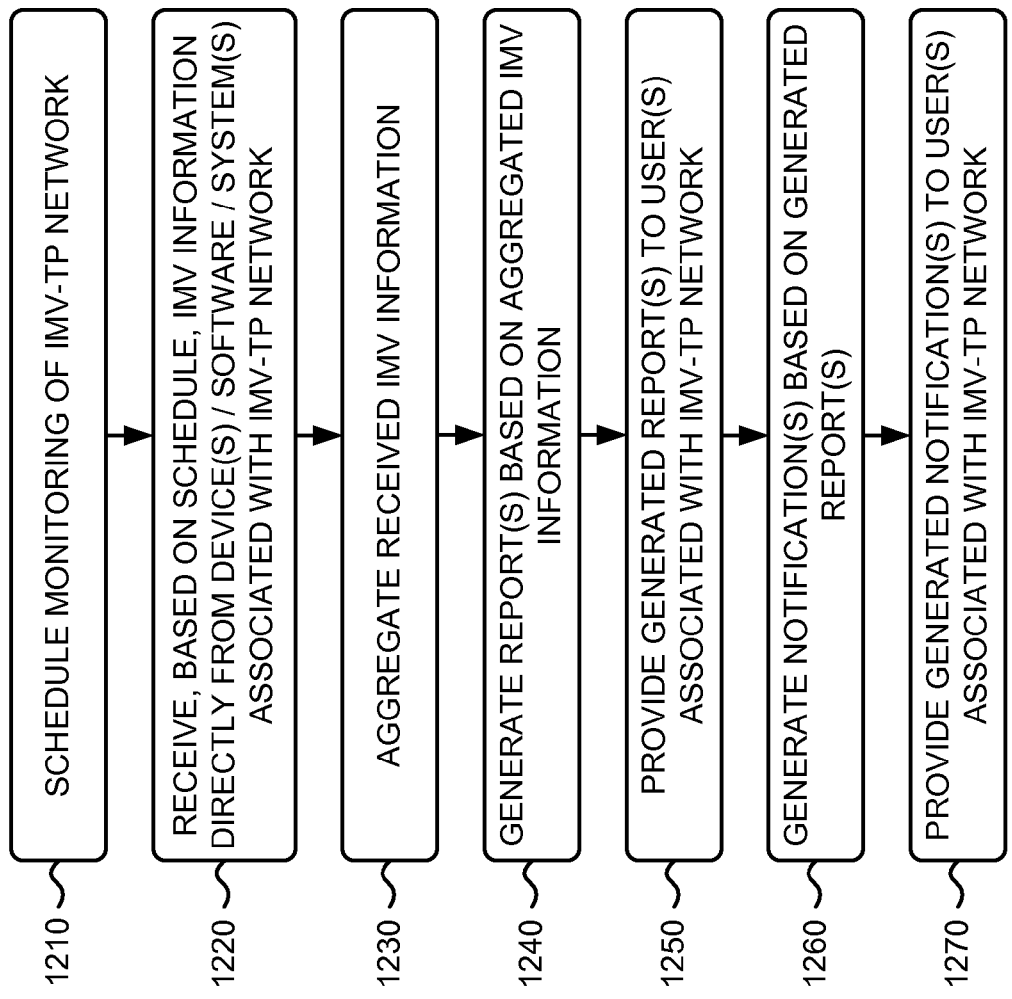
Figure 13:
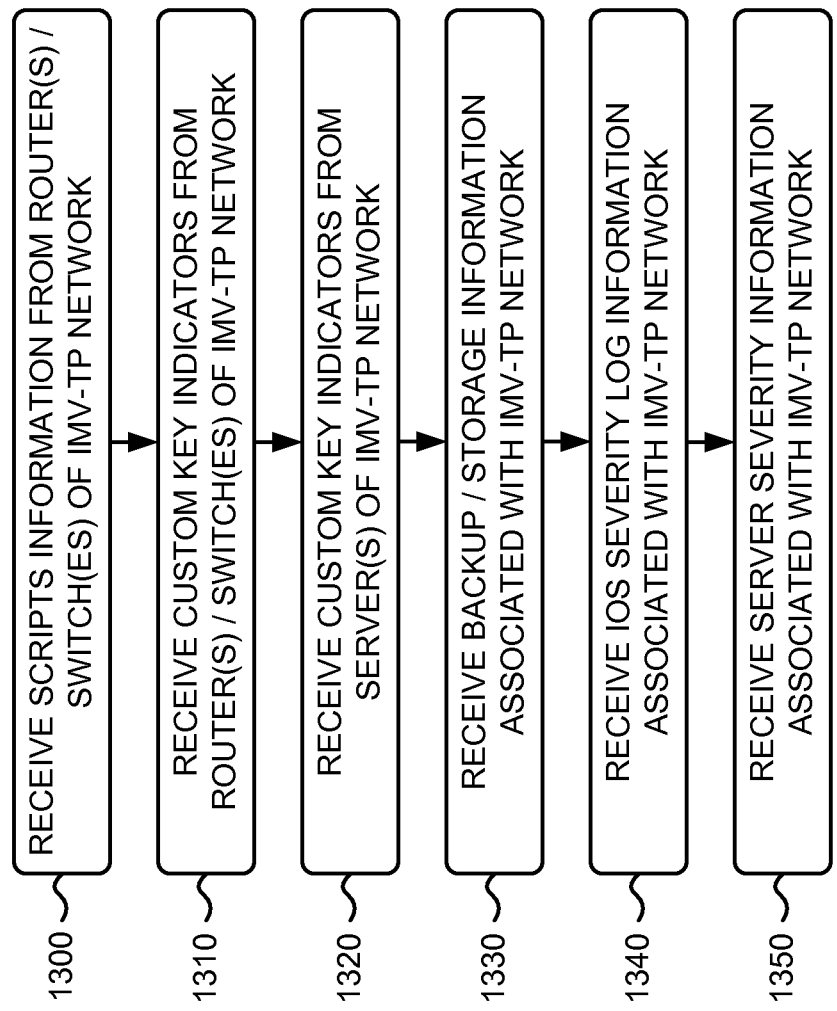

FIGS. 12-14 are flow charts of an example process 1200 for monitoring IMV-TP networks according to implementations described herein. In one implementation, process 1200 may be performed by computing device 140 (e.g., via SIT monitoring tool 145). In another implementation, some or all of process 1200 may be performed by another device or group of devices, including or excluding computing device 140.

As shown in FIG. 12, process 1200 may include scheduling monitoring of an IMV-TP network (block 1210), and receiving, based on the schedule, IMV information directly from device(s), software, and/or system(s) associated with the IMV-TP network (block 1220). For example, in implementations described above in connection with FIG. 1, computing device 140 (e.g., via SIT monitoring tool 145) may schedule monitoring of IMV-TP network 130, and may receive, based on the schedule, IMV information 150 directly from device(s), software, system(s), etc. associated with IMV-TP network 130.

As further shown in FIG. 12, process 1200 may include aggregating the received IMV information (block 1230), generating report(s) based on the aggregated IMV information (block 1240), and providing the generated report(s) to user(s) associated with the IMV-TP network (block 1250). For example, in implementations described above in connection with FIG. 4, report/notification generator 414, of SIT monitoring tool 145, may receive monitored information 160 (e.g., scripts information 420, router/switch CKI information 424, server CKI information 428, backup/storage information 432, IOS severity logs information 436, and/or server severity logs information 440), and may aggregate monitored information 160. Report/notification generator 414 may generate one or more reports 442 based on the aggregated monitored information 160, and may provide reports 442 to users (e.g., network administrators) associated with IMV-TP network 130.

Returning to FIG. 12, process 1200 may include generating notification(s) based on the generated report(s) (block 1260), and providing the generated notification(s) to user(s) associated with the IMV-TP network (block 1270). For example, in implementations described above in connection with FIG. 4, report/notification generator 414 may generate one or more notifications 444 based on reports 442 (e.g., notifications 444 may include reports 442), and may provide notifications 444 to users associated with IMV-TP network 130. In one example implementation, notifications 444 may be provided to the users at a predetermined time. In another implementation, notifications 444 may be immediately provided to the users based on triggers or problems associated with IMV-TP network 130 (e.g., IMV-TP network 130 may be malfunctioning).

Process block 1220 may include the process blocks depicted in FIG. 13. As shown in FIG. 13, process block 1220 may include receiving scripts information from router(s) and/or switch(es) of the IMV-TP network (block 1300), receiving custom key indicator (CKIs) from the router(s) and/or switch(es) of the IMV-TP network (block 1310), and/or receiving CKIs from server(s) of the IMV-TP network (block 1320). For example, in implementations described above in connection with FIG. 4, scripts monitor 402, of SIT monitoring tool 145, may monitor (e.g., based on monitoring schedule 416) router/SBC devices 305 and/or switches 310 for scripts information, as indicated by reference number 418. Based on monitoring 418, router/SBC devices 305 and/or switches 310 may return scripts information 420 to scripts monitor 402. Router/switch CKI monitor 404, of SIT monitoring tool 145, may monitor (e.g., based on monitoring schedule 416) router/SBC devices 305 and/or switches 310 for router/switch CKI information, as indicated by reference number 422. Based on monitoring 422, router/SBC devices 305 and/or switches 310 may return router/switch CKI information 424 to router/switch CKI monitor 404. Server CKI monitor 406, of SIT monitoring tool 145, may monitor (e.g., based on monitoring schedule 416) one or more of servers 315-355 (e.g., UCM 315, TS manager 320, pooled TMS 325, offload TMS 330, KVM device 335, WUS 340, UUS 345, IVC 350, and/or UVC 355) for server CKI information, as indicated by reference number 426. Based on monitoring 426, one or more of servers 315-355 may return server CKI information 428 to server CKI monitor 406.

As further shown in FIG. 13, process block 1220 may include receiving backup/storage information associated with the IMV-TP network (block 1330), receiving IOS severity log information associated with the IMV-TP network (block 1340), and/or receiving server severity information associated with the IMV-TP network (block 1350). For example, in implementations described above in connection with FIG. 4, backup/storage monitor 408, of SIT monitoring tool 145, may monitor (e.g., based on monitoring schedule 416) router/SBC devices 305 and/or switches 310 for backup/storage information, as indicated by reference number 430. Based on monitoring 430, router/SBC devices 305 and/or switches 310 may return backup/storage information 432 to backup/storage monitor 408. IOS severity logs monitor 410, of SIT monitoring tool 145, may monitor (e.g., based on monitoring schedule 416) router/SBC devices 305 and/or switches 310 for IOS severity logs information, as indicated by reference number 434. Based on monitoring 434, one or more of router/SBC devices 305 and/or switches 310 may return IOS severity logs information 436 to IOS severity logs monitor 410. Server severity logs monitor 412, of SIT monitoring tool 145, may monitor (e.g., based on monitoring schedule 416) one or more of servers 315-355 for server severity logs information, as indicated by reference number 438. Based on monitoring 438, one or more of servers 315-355 may return server severity logs information 440 to server severity logs monitor 412.

Process block 1270 may include the process blocks depicted in FIG. 14. As shown in FIG. 14, process block 1270 may include providing the generated notification(s), via email message(s), to the user(s) associated with the IMV-TP network (block 1400), providing the generated notification(s), via SMS message(s), to the user(s) associated with the IMV-TP network (block 1410), providing the generated notification(s), via instant message(s), to the user(s) associated with the IMV-TP network (block 1420), and/or providing the generated notification(s), via call(s), to the user(s) associated with the IMV-TP network (block 1430). For example, in implementations described above in connection with FIG. 11, notification generator 1130, of SIT monitoring tool 145, may generate one or more notifications 444 based on reports 442. Notifications 444 may be provided in a variety of formats, such as email notifications 1160, SMS notifications 1170, instant message (IM) notifications 1180, text-to-speech voice call notifications 1190, etc. Notification schemes may be dynamic and configurable on a per-user or per-group basis, and users may subscribe to receive notifications 444 from SIT monitoring tool 145.

Systems and/or methods described herein may provide a SIT monitoring tool that monitors an entire IMV-TP network. The SIT monitoring tool may monitor, record, and report activities associated with the IMV-TP network (e.g., the different technologies, protocols, servers, software, and/or devices of the IMV-TP network). The SIT monitoring tool may provide an integrity view of the IMV-TP network, and may report custom indicators that allow network administrators to pro-actively address any problems in the IMV-TP network. The SIT monitoring tool may also provide network management capability to organizations supporting the IMV-TP network.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 12-14, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method implemented by a computing device, the method comprising:
   determining, by the computing device, a schedule for monitoring an immersive video-telepresence (IMV-TP) network;
   receiving, by the computing device and based on the schedule, immersive video (IMV) information from one or more of devices, software, or systems associated with the IMV-TP network;
       wherein receiving the IMV information comprises at least one of:
           receiving scripts information from one or more routers or switches of the IMV-TP network,
           receiving custom key indicators from the one or more routers or switches of the IMV-TP network,
           receiving custom key indicators from one or more servers of the IMV-TP network,
           receiving backup or storage information from the one or more routers or switches of the IMV-TP network,
           receiving internetwork operating system (IOS) severity log information from the one or more routers or switches of the IMV-TP network, or
           receiving server severity log information from the one or more servers of the IMV-TP network;
   aggregating, by the computing device, the received IMV information;
   generating, by the computing device, a report based on the aggregated IMV information; and
   providing, by the computing device, the generated report to one or more users associated with the IMV-TP network.

2. The method of claim 1, where the schedule is determined based on input received from a user of the computing device.

3. The method of claim 1, further comprising:
   determining whether the aggregated IMV information includes values that are outside of a predetermined threshold; and
   generating an alarm when the aggregated IMV information includes values that are outside of the predetermined threshold.

4. The method of claim 3, where the alarm is provided with the generated report.

5. The method of claim 1, further comprising:
   generating a notification based on the generated report; and
   providing the generated notification to the one or more users associated with the IMV-TP network.

6. The method of claim 5, where providing the generated notification comprises at least one of:
   providing the generated notification, via email messages, to the one or more users associated with the IMV-TP network;
   providing the generated notification, via short message service (SMS) messages, to the one or more users associated with the IMV-TP network;
   providing the generated notification, via instant messages, to the one or more users associated with the IMV-TP network; or
   providing the generated notification, via calls, to the one or more users associated with the IMV-TP network.

7. The method of claim 5, where the notification is generated based on a notification scheme that is configurable on a per-user or per-group basis.

8. The method of claim 1, further comprising:
   storing the received IMV information in a data cache associated with the computing device.

9. The method of claim 8, where the data cache includes historical IMV information previously generated by the IMV-TP network.

10. A computing device, comprising:
    a memory configured to store a plurality of instructions; and
    a processor configured to execute instructions in the memory to:
        receive a schedule for monitoring an immersive video-telepresence (IMV-TP) network,
        receive, based on the schedule, immersive video (IMV) information directly from one or more of devices, software, or systems associated with the IMV-TP network,
            wherein, when receiving the IMV information, the processor is further configured to execute instructions in the memory to at least one of:
                receive scripts information from one or more routers or switches of the IMV-TP network,
                receive custom key indicators from one or more servers of the IMV-TP network,
                receive backup or storage information from the one or more routers or switches of the IMV-TP network,
                receive internetwork operating system (IOS) severity log information from the one or more routers or switches of the IMV-TP network, or
                receive server severity log information from the one or more servers of the IMV-TP network,
        aggregate the received IMV information,
        generate a report based on the aggregated IMV information,
        provide the generated report to one or more users associated with the IMV-TP network,
        generate a notification based on the generated report, and
        provide the generated notification to the one or more users associated with the IMV-TP network.

11. The computing device of claim 10, where the schedule is one of automatically determined by the computing device or determined based on input received from a user of the computing device.

12. The computing device of claim 10, where the processor is further configured to execute instructions in the memory to:
    determine whether the aggregated IMV information includes values that are outside of a predetermined threshold, and
    generate an alarm when the aggregated IMV information includes values that are outside the predetermined threshold, where the alarm is provided with the generated report.

13. The computing device of claim 10, where, when providing the generated notification, the processor is further configured to execute instructions in the memory to at least one of:
    provide the generated notification, via email messages, to the one or more users associated with the IMV-TP network;
    provide the generated notification, via short message service (SMS) messages, to the one or more users associated with the IMV-TP network,
    provide the generated notification, via instant messages, to the one or more users associated with the IMV-TP network, or provide the generated notification, via calls, to the one or more users associated with the IMV-TP network.

14. The computing device of claim 10, where the notification is generated based on a notification scheme that is configurable on a per-user or per-group basis.

15. The computing device of claim 10, where the processor is further configured to execute instructions in the memory to:
store the received IMV information in a data cache associated with the computing device, where the data cache includes historical IMV information previously generated by the IMV-TP network.

16. One or more non-transitory computer-readable media storing instructions executable by one or more processors of a computing device, the media storing one or more instructions for:
receiving a schedule for monitoring an immersive video-telepresence (IMV-TP) network;
receiving, based on the schedule, immersive video (IMV) information directly from one or more of devices, software, or systems associated with the IMV-TP network;
wherein the IMV information includes at least one of:
scripts information received from one or more routers or switches of the IMV-TP network,
custom key indicators received from the one or more routers or switches of the IMV-TP network,
custom key indicators received from one or more servers of the IMV-TP network,
backup or storage information received from the one or more routers or switches of the IMV-TP network,
internetwork operating system (IOS) severity log information received from the one or more routers or switches of the IMV-TP network, or
server severity log information received from the one or more servers of the IMV-TP network;
storing the received IMV information in a data cache associated with the computing device, where the data cache includes historical IMV information previously generated by the IMV-TP network;
aggregating the received IMV information;
generating a report based on the aggregated IMV information;
providing the generated report to one or more users associated with the IMV-TP network;
generating a notification based on the generated report; and
providing the generated notification to the one or more users associated with the IMV-TP network.

17. The media of claim 16, where the schedule is one of automatically determined by the computing device or determined based on input received from a user of the computing device.

18. The media of claim 16, where the media stores one or more instructions for:
determining whether the aggregated IMV information includes values that are outside of a predetermined threshold; and
generating an alarm when the aggregated IMV information includes values that are outside the predetermined threshold, where the alarm is provided with the generated report or the generated notification.

19. The media of claim 16, where the generated notification is provided to the one or more users via at least one of:
an email message,
a short message service (SMS) message,
an instant message, or
a call.

20. The media of claim 16, where the notification is generated based on a notification scheme that is configurable on a per-user or per-group basis.

\* \* \* \* \*